United States Patent
Nanba

(10) Patent No.: US 9,692,059 B2
(45) Date of Patent: Jun. 27, 2017

(54) MANUFACTURING METHOD OF METAL CATALYST-SUPPORTING CARRIER, METAL CATALYST-SUPPORTING CARRIER, MANUFACTURING METHOD OF FUEL CELL AND CATALYST SUPPORTING DEVICE

(71) Applicant: TOYOTA JIDOSHA KABUSHIKI KAISHA, Toyota-shi, Aichi-ken (JP)

(72) Inventor: Ryoichi Nanba, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/646,082

(22) PCT Filed: Nov. 21, 2012

(86) PCT No.: PCT/JP2012/007471
§ 371 (c)(1),
(2) Date: May 20, 2015

(87) PCT Pub. No.: WO2014/080439
PCT Pub. Date: May 30, 2014

(65) Prior Publication Data
US 2015/0270556 A1 Sep. 24, 2015

(51) Int. Cl.
*B01J 23/58* (2006.01)
*B01J 23/63* (2006.01)
(Continued)

(52) U.S. Cl.
CPC ........... *H01M 4/9083* (2013.01); *B01J 21/18* (2013.01); *B01J 21/185* (2013.01); *B01J 23/56* (2013.01);
(Continued)

(58) Field of Classification Search
CPC ...... B01J 21/18; B01J 21/185; B01J 19/0013; B01J 37/00; B01J 23/38; B01J 23/58;
(Continued)

(56) References Cited

U.S. PATENT DOCUMENTS 6,958,308 B2 * 10/2005 Brown .................... B01J 21/18
427/115
2004/0077494 A1 * 4/2004 LaBarge ............... B01D 53/945
502/303

(Continued)

FOREIGN PATENT DOCUMENTS

DE 102011083762 A1 4/2012
JP 2000-017442 A 1/2000
(Continued)

OTHER PUBLICATIONS

"The effect of temperature, catalyst, different carrier gases and stirrer on the produced transportation hydrocarbons of LLDPE degradation in a sitrred reactor," Mehrdad Seifali Abbas-Abadi et al. Journal of Analytical and Applied Pyrolysis 95 (2012), pp. 198-204.*

*Primary Examiner* — Patricia L Hailey
(74) *Attorney, Agent, or Firm* — Andrews Kurth Kenyon LLP

(57) ABSTRACT

There is provided a technique that suppresses a variation in particle diameter of a metal catalyst in the process of supporting the metal catalyst on a carrier. A CNT substrate having carbon nanotubes (CNTs) as the carrier arrayed thereon is placed in a processing chamber. Carbon dioxide is supplied to the processing chamber. After the carbon dioxide in the processing chamber is made supercritical, a complex solution in which a platinum complex is dissolved is supplied to the processing chamber. A sample temperature denoting temperature of the CNTs is controlled to be higher than an ambient temperature in the processing chamber. The (Continued)

CNT substrate is heated, such that a temperature difference between the ambient temperature and the sample temperature repeats increasing and decreasing. After the state of the supercritical fluid is changed to a non-supercritical state, the CNT substrate is heated, so as to cause the metal catalyst to deposit on the surface of the CNTs.

8 Claims, 12 Drawing Sheets

(51) Int. Cl.
*H01M 4/90* (2006.01)
*H01M 4/88* (2006.01)
*B01J 21/18* (2006.01)
*B01J 23/56* (2006.01)
*B01J 23/70* (2006.01)
*H01M 4/92* (2006.01)
*H01M 8/1018* (2016.01)

(52) U.S. Cl.
CPC ............... *B01J 23/70* (2013.01); *H01M 4/88* (2013.01); *H01M 4/8814* (2013.01); *H01M 4/8846* (2013.01); *H01M 4/9075* (2013.01); *H01M 4/926* (2013.01); *H01M 2008/1095* (2013.01)

(58) Field of Classification Search
CPC ...... B01J 23/63; B01J 23/8913; B01J 23/892; H01M 4/9083; H01M 4/88; H01M 4/8814; H01M 4/8825; H01M 4/8846; H01M 4/9075; H01M 4/926
USPC .......... 502/185, 439, 100; 75/717, 722, 739; 427/96.7, 96.8, 123, 126.1, 215–217
See application file for complete search history.

(56) References Cited

U.S. PATENT DOCUMENTS

| | | |
|---|---|---|
| 2007/0264175 A1 | 11/2007 | Iversen et al. |
| 2012/0088650 A1 | 4/2012 | Hama et al. |
| 2013/0045438 A1* | 2/2013 | Haba ...................... H01M 4/881 429/535 |
| 2014/0205930 A1 | 7/2014 | Hasegawa et al. |

FOREIGN PATENT DOCUMENTS

| | | | |
|---|---|---|---|
| JP | 2003-088756 A | 3/2003 | |
| JP | 2003-340244 | * 12/2003 | ............. B01D 53/94 |
| JP | 2006-273613 A | 10/2006 | |
| JP | 2007-511357 A | 5/2007 | |
| JP | 2012-076048 A | 4/2012 | |
| JP | 2013-049005 A | 3/2013 | |
| JP | 20150070326 A | * 6/2015 | ............. H01M 4/88 |

\* cited by examiner $$\Delta G = \frac{4\pi r^3}{3}\Delta Gv + 4\pi r^2 \gamma$$

$\Delta Gv$ : FREE ENERGY VARIATION PER UNIT VOLUME
$\gamma$ : SURFACE FREE ENERGY PER UNIT VOLUME
r : PARTICLE DIAMETER OF CRYSTAL NUCLEI
  (ON ASSUMPTION THAT CRYSTAL NUCLEI ARE SPHERICAL)

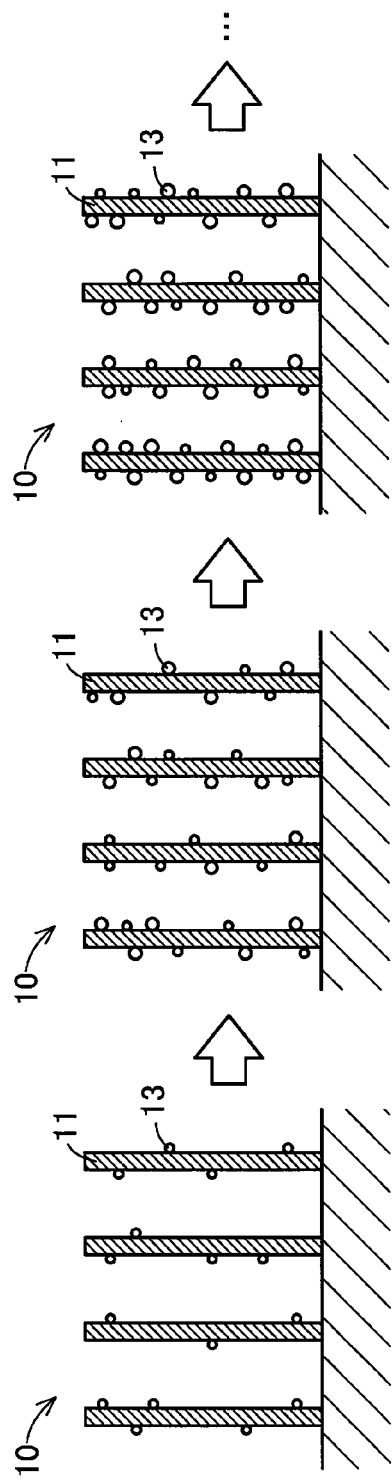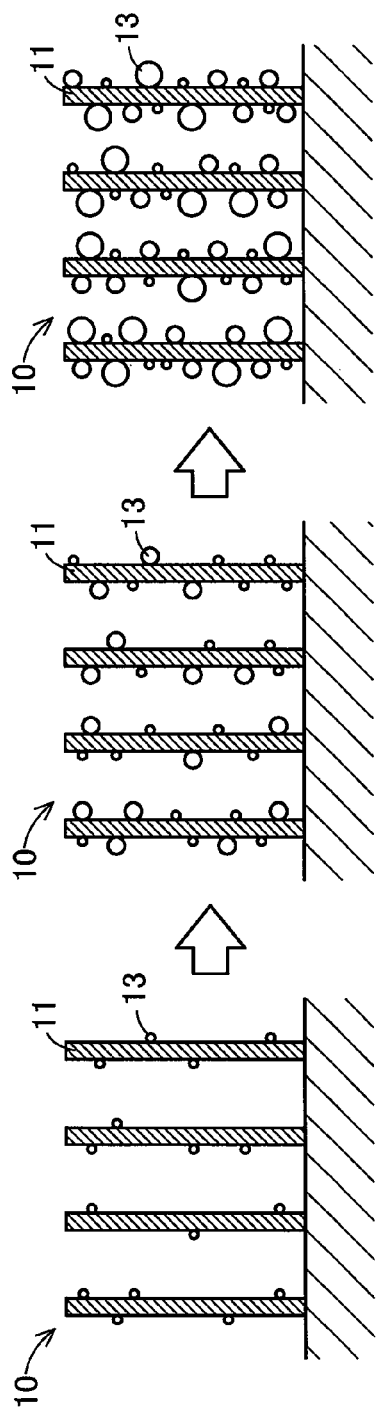
Fig.7A
Fig.7B

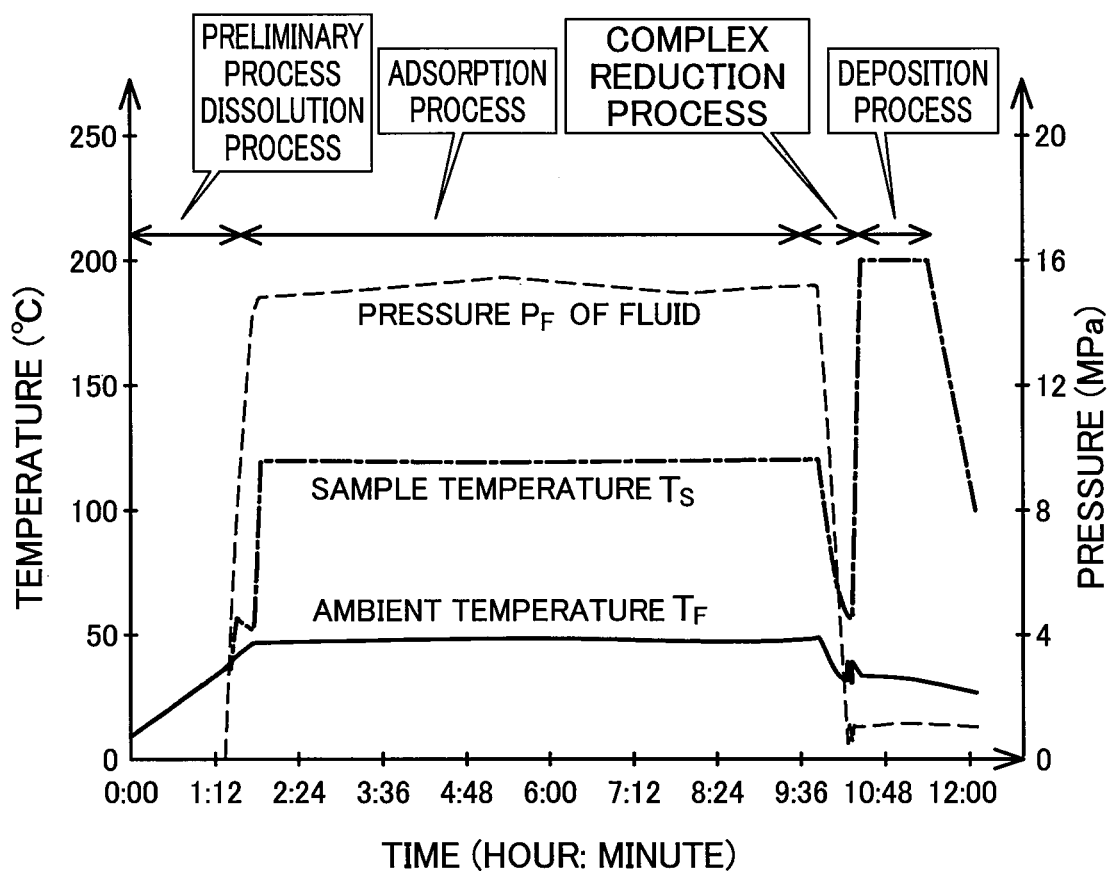

Fig.11A

| PROCESSING CONDITIONS | | EXAMPLE 1 | EXAMPLE 2 | REFERENCE EXAMPLE |
|---|---|---|---|---|
| PROCESSING CONDITIONS | PROCESSING TIME | ABOUT 8 HOURS | ABOUT 5 HOURS | ABOUT 8 HOURS |
| PROCESSING CONDITIONS | FREQUENCY OF VARYING TEMPERATURE | 10 TIMES | 5 TIMES | 0 TIMES |
| MEASUREMENT RESULTS | AVERAGE PARTICLE DIAMETER (nm) | 1.85 | 1.75 | 2.97 |
| MEASUREMENT RESULTS | STANDARD DEVIATION ($\sigma$) | 0.25 | 0.26 | 1.54 |
| MEASUREMENT RESULTS | WEIGHT PER UNIT AREA(mg/cm$^2$) | 0.1 | 0.05 | 0.1 |

Fig.11B

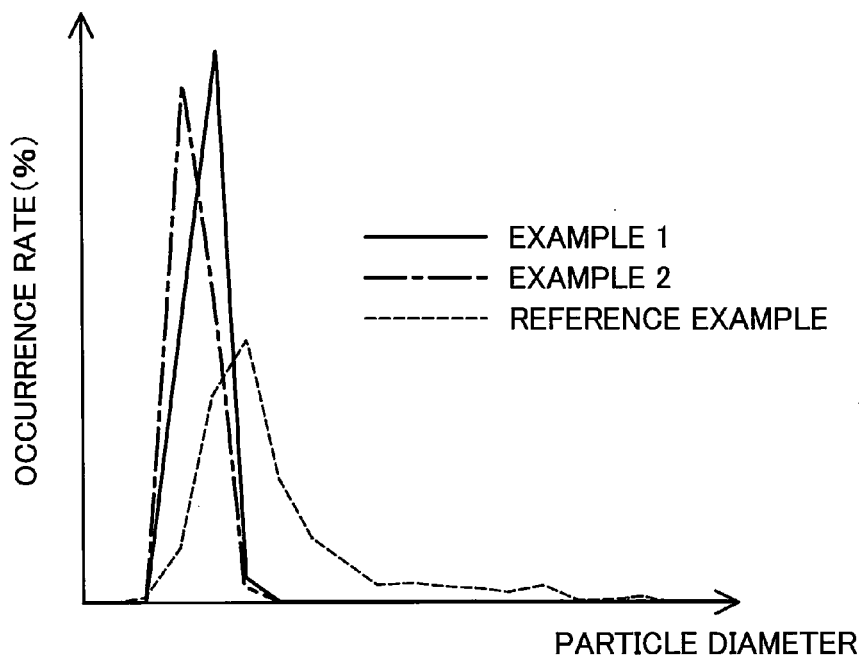

EXAMPLE 1

EXAMPLE 2

REFERENCE EXAMPLE

MANUFACTURING METHOD OF METAL CATALYST-SUPPORTING CARRIER, METAL CATALYST-SUPPORTING CARRIER, MANUFACTURING METHOD OF FUEL CELL AND CATALYST SUPPORTING DEVICE

CROSS-REFERENCE TO RELATED APPLICATION

This is a national phase application based on the PCT International Patent Application No. PCT/JP2012/007471 filed Nov. 21, 2012, the entire contents of which are incorporated herein by reference.

TECHNICAL FIELD

The present invention relates to a metal catalyst-supporting carrier in which a metal catalyst is supported on a carrier.

BACKGROUND ART

A metal catalyst may be supported in small cavities of a carrier base material. For example, in a fuel cell, an electrode may be made of an electrically conductive material having small cavities serving as a diffusion path of a reactive gas, and platinum as a metal catalyst for accelerating an electrochemical reaction may be supported in the cavities of this electrically conductive material. Techniques described in Patent Literatures 1 and 2 given below have been proposed to support the metal catalyst in the small cavities of the carrier base material. The technique disclosed in Patent Literature 1 or Patent Literature 2 disperses a platinum complex solution in supercritical carbon dioxide and supports platinum on a carbon nanotube substrate or a porous substrate placed in the supercritical carbon dioxide.

CITATION LIST

Patent Literature

PTL 1: JP 2012-076048A
PTL 2: JP 2000-017442A

SUMMARY

Technical Problem

In the electrode of the fuel cell, it is preferable that the metal catalyst has uniform particle diameter. Dispersing and supporting the metal catalyst of the uniform particle diameter in the electrode ensures the surface area of the metal catalyst in the electrode and improves the power generation performance of the fuel cell. The non-uniform particle diameter of the metal catalyst in the electrode is, on the contrary, likely to cause the metal catalyst of the smaller particle diameter to be absorbed in the metal catalyst of the larger particle diameter and reduce the surface area of the metal catalyst in the electrode. Accordingly, in the fuel cell, it is preferable to suppress non-uniformity, ie, a variation in particle diameter of the metal catalyst in the electrode. Suppression of a variation in particle diameter of the metal catalyst is not only the problem in the field of fuel cells but is the common problem in the field that uses the metal catalyst for the electrode or the like.

Patent Literatures 1 and 2 have the disclosure of using the supercritical fluid to improve the dispersibility of the metal catalyst on the carrier base material but have no disclosure suppressing a variation in particle diameter of the metal catalyst. The prior art techniques have taken no sufficient consideration of suppression of a variation in particle diameter of the metal catalyst. Additionally, there is still a room for improvement in dispersibility of the metal catalyst in the carrier. Other needs relating to the metal catalyst supporting process include reduction of the processing cost, resource saving in the processing, simplification of the processing, downsizing of a processing device and processing equipment and improvement of the usability.

Solution to Problem

In order to solve at least part of the problems described above, the invention may be implemented by aspects described below.

[1] According to one aspect of the invention, there is provided a manufacturing method of a metal catalyst-supporting carrier in which a metal catalyst is supported on a carrier. This method comprises: (a) a process of placing the carrier in a processing chamber, filling the processing chamber with a supercritical fluid and dispersing a complex of the metal catalyst in the supercritical fluid; (b) a process of controlling at least one of a temperature of the carrier and an ambient temperature in the processing chamber, so as to vary a temperature difference between the temperature of the carrier and the ambient temperature; and (c) a process of changing state of the supercritical fluid to a non-supercritical state and subsequently causing the metal catalyst to deposit on surface of the carrier. This manufacturing method varies the temperature difference between the temperature of the carrier and the ambient temperature in the process of adsorbing crystal nuclei of the metal catalyst on the carrier, so as to spread the time in the course of growth of the crystal nuclei of the metal catalyst. This reduces the difference in particle diameter, i.e., the crystal nuclei of the metal catalyst formed earlier have the larger particle diameter. This accordingly suppresses a variation in particle diameter of the metal catalyst on the carrier.

[2] In the manufacturing method of the above aspect, the process (b) may control a heating temperature of the carrier, so as to change the temperature of the carrier. The manufacturing method of this aspect readily suppresses a variation in particle diameter of the metal catalyst by controlling the heating temperature of the carrier.

[3] In the manufacturing method of the above aspect, the process (b) may comprise the steps of: (b1) increasing the temperature of the carrier above the ambient temperature; and (b2) temporarily reducing the temperature difference between the temperature of the carrier and the ambient temperature, after the step (b1). The manufacturing method of this aspect causes a concentration distribution of the complex in the vicinity of the carrier by increasing the temperature of the carrier above the ambient temperature, so as to accelerate adsorption of the complex of the metal catalyst onto the surface of the carrier. The manufacturing method of this aspect then temporarily reduces the temperature difference between the temperature of the carrier and the ambient temperature. This temporarily suppresses the growth of the crystal nuclei formed earlier and thereby reduces a difference in particle diameter between the crystal nuclei formed earlier and the crystal nuclei formed later. Accordingly, this suppresses a variation in particle diameter of the metal catalyst on the carrier.

[4] In the manufacturing method of the above aspect, the step (b2) may decrease the temperature of the carrier to a first temperature slightly higher than the ambient temperature and subsequently increase the temperature of the carrier to a second temperature lower than a deposition temperature of the metal catalyst. The manufacturing method of this aspect significantly varies the temperature difference between the temperature of the carrier and the ambient temperature in the process of adsorbing the complex of the metal catalyst on the carrier. This further reduces a variation in particle diameter of the metal catalyst.

[5] In the manufacturing method of the above aspect, the step (b2) may repeat decreasing and increasing the temperature difference a plurality of times over an entire time period after the step (b1) and until the state of the supercritical fluid is changed to the non-supercritical state in the process (c). This method suppresses the growth of the crystal nuclei which are in the thermodynamically stable growth state, a plurality of times at multiple stages in the process of adsorbing the crystal nuclei of the metal catalyst on the carrier. This more effectively reduces the difference in particle diameter between the crystal nuclei formed earlier and the crystal nuclei formed later and further suppresses a variation in particle diameter of the metal catalyst.

[6] In the manufacturing method of the above aspect, a time period after the step (b1) and until the state of the supercritical fluid is changed to the non-supercritical state in the process (c) may be determined according to a target amount of the metal catalyst to be supported on the carrier. This method adjusts the amount of the metal catalyst to be supported on the carrier, while suppressing a variation in particle diameter of the metal catalyst.

[7] According to another aspect of the invention, there is provided a metal catalyst-supporting carrier in which a metal catalyst is supported on a carrier. This metal catalyst-supporting carrier is manufactured by the manufacturing method of any of the above aspects described in [1] to [6]. This metal catalyst-supporting carrier has suppression of a variation in particle diameter of the metal catalyst and is thereby suitable for an electrode which is a reaction field of, for example, an electrochemical reaction.

[8] According to another aspect of the invention, there is provided a manufacturing method of a fuel cell. This method comprises (A) a process of manufacturing a metal catalyst-supporting carrier in which a metal catalyst is supported on an electrically conductive carrier by the manufacturing method of any of the above aspects described in [1] to [6]; and (B) a process of forming an electrode layer having gas diffusivity from the metal catalyst supporting-carrier, such as to place the electrode layer on a surface of an electrolyte membrane. This manufacturing method provides a fuel cell having a reduced variation in particle diameter of the metal catalyst in the electrode.

[9] According to another aspect of the invention, there is provided a catalyst supporting device configured to support a metal catalyst on a carrier. This catalyst supporting device comprises a processing chamber which the carrier is placed in and which is filled with a supercritical fluid having a complex of the metal catalyst dispersed therein; and a temperature controller configured to control at least one of a temperature of the carrier placed in the processing chamber and an ambient temperature in the processing chamber. The temperature controller performs (i) a first temperature control of varying a temperature difference between the temperature of the carrier and the ambient temperature and (ii) a second temperature control of changing state of the fluid to a non-supercritical state and subsequently heating the carrier to cause the metal catalyst to deposit on surface of the carrier. This catalyst supporting device varies the temperature difference between the temperature of the supercritical fluid and the temperature of the carrier in the process of adsorbing the crystal nuclei of the metal catalyst on the carrier. This suppresses a variation in particle diameter of the metal catalyst.

All the plurality of components included in each of the aspects of the invention described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the invention described above may be combined with part or all of the technical features included in another aspect of the invention described later to provide still another independent aspect of the invention.

The invention may be actualized by any of various aspects other than the methods and the devices described above, for example, a control method of a metal catalyst supporting device, a manufacturing apparatus of a catalyst electrode for fuel cell and its control method, a computer program for implementing each of these control methods, and a non-transitory recording medium in which such a computer program is recorded.

BRIEF DESCRIPTION OF DRAWINGS

FIG. 7A and FIG. 7B are schematic diagrams illustrating formation and growth of crystal nuclei of a metal catalyst in the adsorption process;

FIG. 10 is a diagram showing processing conditions of Reference Example;

FIG. 11A and FIG. 11B are diagrams illustrating the results of experiment of Examples 1 and 2 and Reference Example;

DESCRIPTION OF EMBODIMENTS

A. First Embodiment

Figure 1:
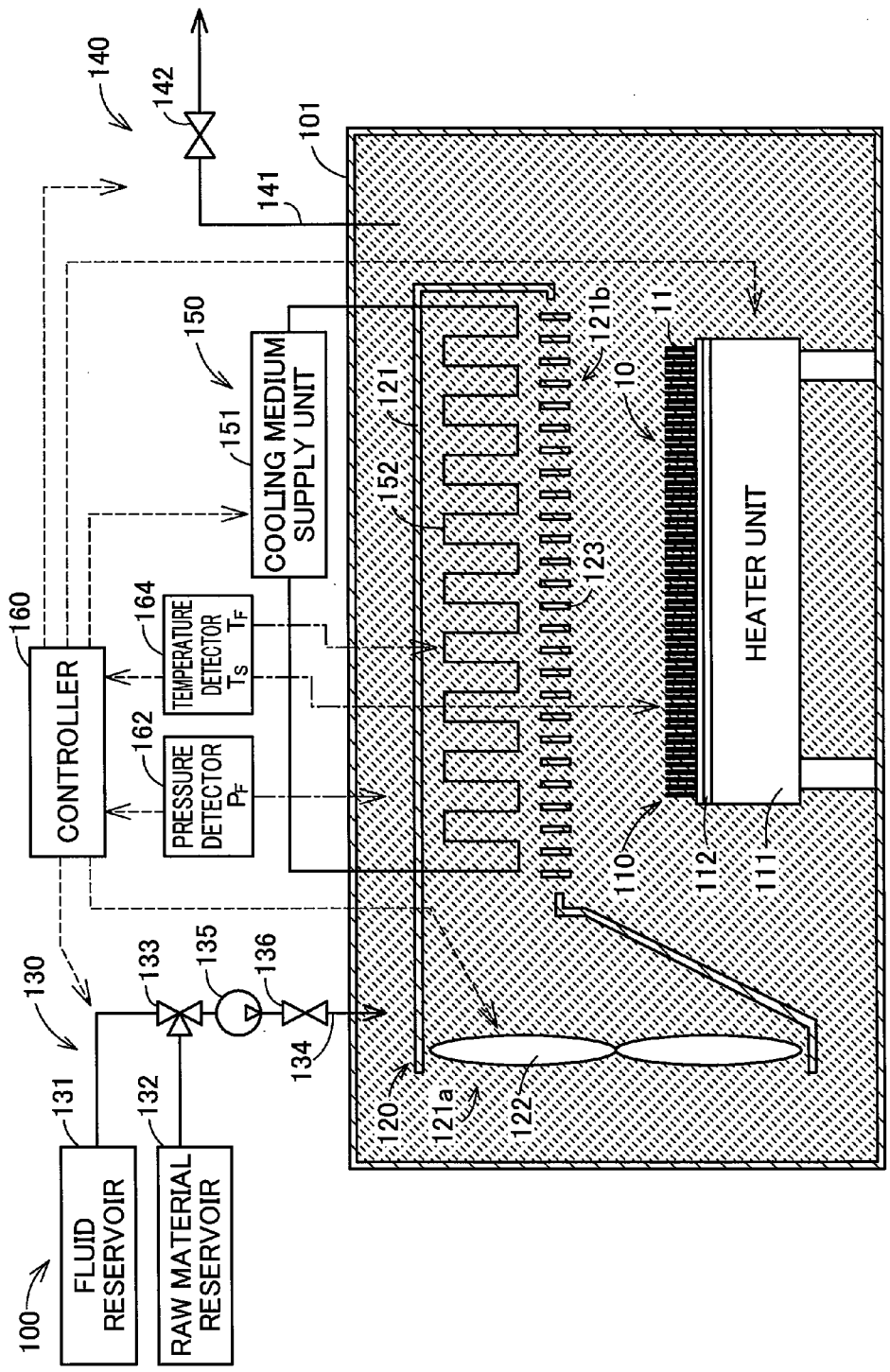
FIG. 1 is a schematic diagram illustrating the configuration of a catalyst supporting device.

FIG. 1 is a schematic diagram illustrating the configuration of a catalyst supporting device according to one embodiment of the invention. This catalyst supporting device 100 uses a supercritical fluid to support a metal catalyst on a carrier. This embodiment uses carbon dioxide in a supercritical state (hereinafter also called "supercritical carbon dioxide") as the supercritical fluid. This embodiment uses carbon nanotubes (hereinafter referred to as "CNTs") as the carrier, on which platinum (Pt) is supported as the metal catalyst.

The catalyst carrying device 100 includes a processing chamber 101, a carrier mounting structure 110, a fluid circulation nozzle 120, a fluid supply assembly 130, a fluid discharge assembly 140, a fluid temperature controller 150, a controller 160, a pressure detector 162 and a temperature detector 164. The processing chamber 101 is an air-tight chamber that may be filled with the supercritical fluid. The carrier mounting structure 110 and the fluid circulation nozzle 120 are placed in the processing chamber 101. The fluid mounting structure 110 is equipped with a heater unit 111, and a CNT substrate 10 with CNTs 11 arrayed thereon as the carrier is mounted on the upper surface of the heater unit 111.

Figure 2:
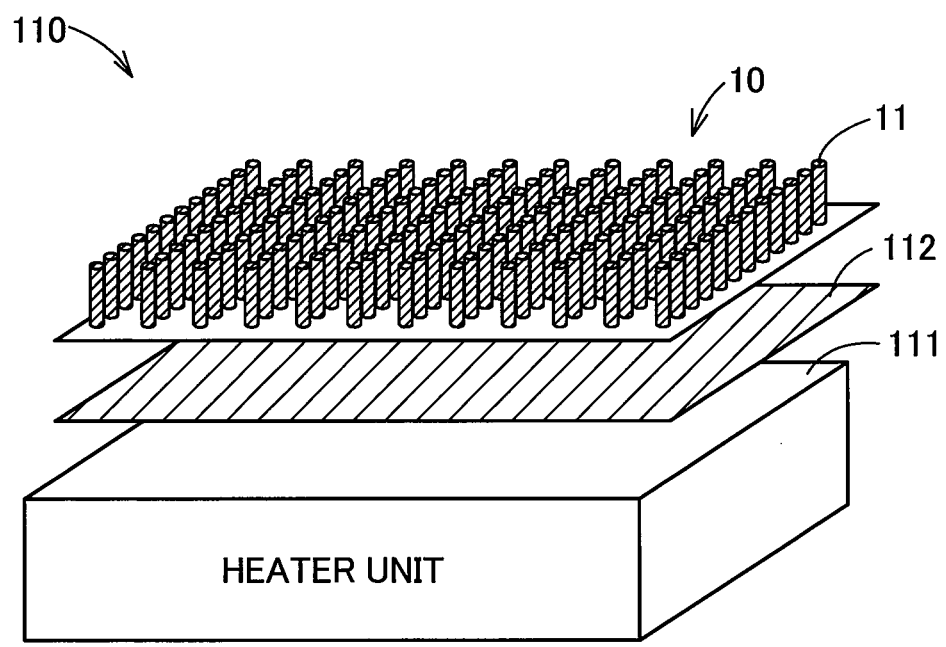
FIG. 2 is a schematic perspective view illustrating the geometry of a carbon nanotubes substrate and a carrier mounting structure.

FIG. 2 is a schematic perspective view illustrating the geometry of the CNT substrate 10 and the carrier mounting structure 110. The CNT substrate 10 has a large number of CNTs 11 grown perpendicularly from a substrate surface in a densely packed manner with small cavities formed therebetween. The CNT substrate 10 is mounted on the upper surface of the heater unit 111 of the carrier mounting structure 110 across a contact layer 112. The heater unit 111 heats the CNT substrate 11 placed on the contact layer 112 by electrical heating. The contact layer 112 is a sheet member serving to improve the thermal conductivity between the heater unit 111 and the CNT substrate 10. The contact layer 112 may be made of, for example, a silicon gel sheet having high thermal conductivity.

The fluid circulation nozzle 120 (FIG. 1) is a nozzle used to circulate the supercritical fluid and thereby make a flow of the supercritical fluid toward the carrier mounting structure 110 in the processing chamber 101. The fluid circulation nozzle 120 includes a main body 121 which is a hollow vessel placed above the carrier mounting structure 110 such as to cover over the carrier mounting structure 110. The main body 121 has a first opening 121a that is opened to a side wall surface of the processing chamber 101 and a second opening 121b that is opened to an upper surface of the carrier mounting structure 110.

A circulation fan 122 is provided at the first opening 121a of the main body 121, and current plates 123 provided as a plurality of flow path wall members arrayed in parallel are provided at the second opening 121b. A cooling medium circulation piping 152 of the fluid temperature controller 150 is placed in the main body 121. The fluid circulation nozzle 120 is arranged to flow the supercritical fluid into the main body 121 through the first opening 121a by rotating and driving the circulation fan 122. The fluid circulation nozzle 120 is also arranged to flow the supercritical fluid out of the main body 121 along the wall surface of the current plates 123 at the second opening 121b.

The fluid supply assembly 130 includes a fluid reservoir 131, a raw material reservoir 132, a three-way valve 133, a supply piping 134, a pump 135 and an on-off valve 136. The fluid reservoir 131 is configured to store the fluid in a supercritical state in the processing chamber 101. According to this embodiment, the fluid reservoir 131 stores carbon dioxide in the gas state. The raw material reservoir 132 is configured to store a complex solution in which a complex of the metal catalyst is dissolved. In this embodiment, the raw material reservoir 132 stores a solution in which dimethylcyclooctadiene platinum (II) is dissolved in hexane (normal hexane).

The fluid reservoir 131 and the raw material reservoir 132 are connected with the supply piping 134 via the three-way valve 133, and the supply piping 134 is connected with the processing chamber 101. The supply piping 134 is equipped with the pump 135 and the on-off valve 136. The fluid supply assembly 130 supplies either one of the fluid stored in the fluid reservoir 131 and the complex solution stored in the raw material reservoir 132 through the supply piping 134 to the processing chamber 101 by switching control of the three-way valve 133. The fluid supply assembly 130 also regulates the rotation speed of the pump 135 to control the pressure in the processing chamber 101, and controls opening and closing the on-off valve 136 to control the inflow of the fluid or the complex solution into the processing chamber 101.

The fluid discharge assembly 140 includes a discharge piping 141 and an on-off valve 142. The discharge piping 141 is connected with the processing chamber 101. The on-off valve 142 is provided on the discharge piping 141. The fluid discharge assembly 140 opens and closes the on-off valve 142 to control discharge of the fluid from the processing chamber 101. The discharge piping 141 may be provided with a pump for sucking the fluid out of the processing chamber 101.

The fluid temperature controller 150 includes a cooling medium supply unit 151 and the cooling medium circulation piping 152. As described above, the cooling medium circulation piping 152 is placed in the main body 121 of the fluid circulation nozzle 120. The cooling medium circulation piping 152 has an inlet opening and an outlet opening connected with the cooling medium supply unit 151. The cooling medium supply unit 151 has a heat exchanger and a pump not shown in figures and is configured to circulate the temperature-controlled cooling medium through the cooling medium circulation piping 152. In the catalyst supporting device 100 of the embodiment, the temperature of the supercritical fluid in the processing chamber 101 is regulated through temperature control of the cooling medium by the fluid temperature controller 150. The cooling medium circulation piping 152 may not be necessarily placed in the main body 121 of the fluid circulation nozzle 120 but may be placed outside of the fluid circulation nozzle 120.

The controller 160 is configured by a microcomputer including a center processing unit and a main memory. The controller 160 controls the respective components described above based on the detection values of the pressure detector 162 and the temperature detector 164, so as to support the metal catalyst on the carrier. The pressure detector 162 detects a pressure $P_F$ of the fluid in the processing chamber 101 and outputs the detected pressure $P_F$ to the controller 160. The temperature detector 164 detects an ambient temperature $T_F$ in the processing chamber 101 and a temperature $T_S$ of the carrier (hereinafter also called "sample temperature $T_S$") and sends the detected temperatures $T_F$ and $T_S$ to the controller 160.

When the processing chamber 101 is filled with the supercritical fluid, the ambient temperature $T_F$ denotes the temperature of the supercritical fluid. The supercritical fluid generally has the high thermal conductivity, so that the ambient temperature $T_F$ may be measured at any position in the processing chamber 101 except an area near to the heater unit 111. The sample temperature $T_S$ denotes the temperature of the CNTs 11 as the carrier and is measured as the heating temperature by the heater unit 111 according to this embodiment.

Figure 3:
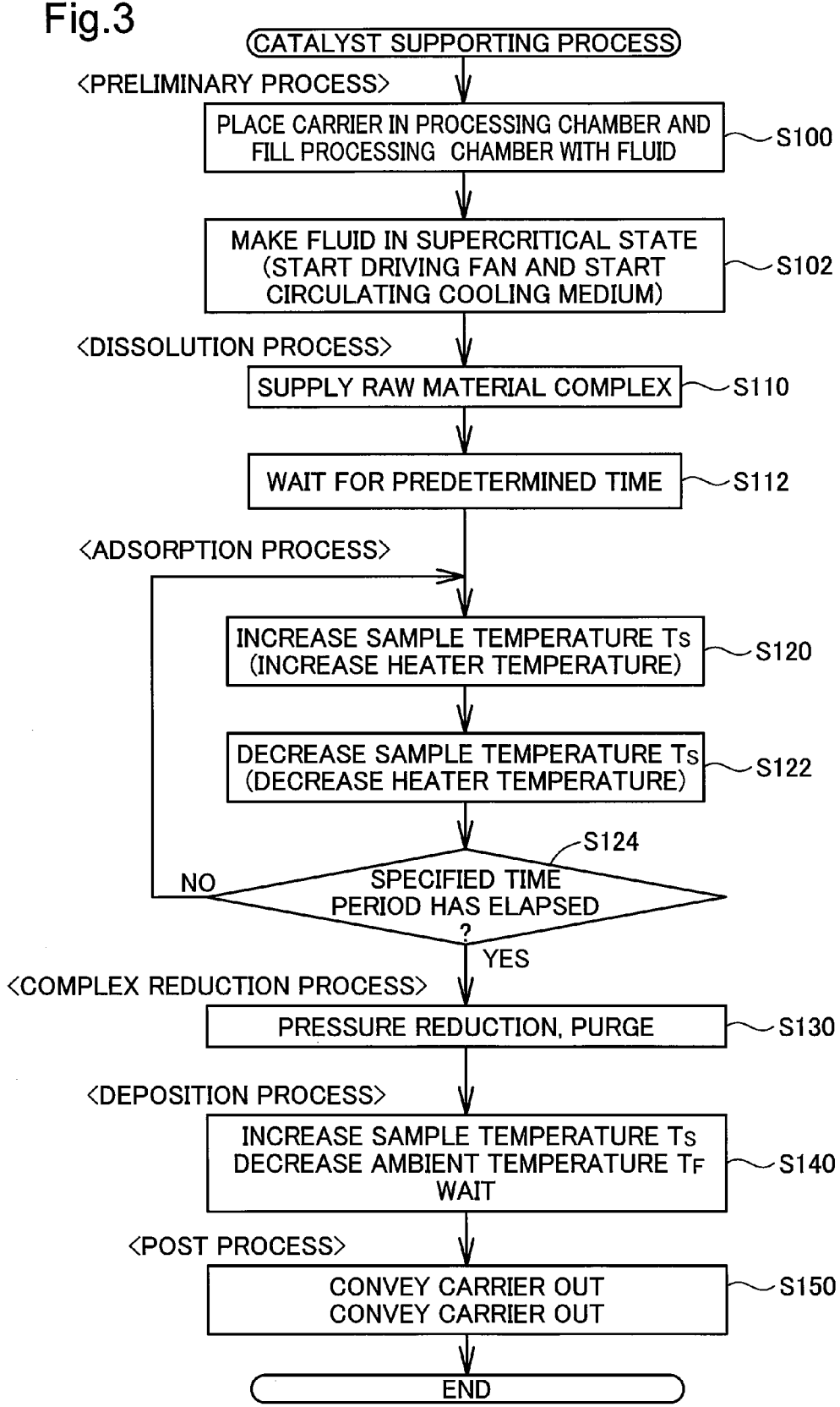
FIG. 3 is a flowchart showing a procedure of metal catalyst supporting process on a carrier in the catalyst supporting device.

FIG. 3 is a flowchart showing a procedure of metal catalyst supporting process on the carrier in the catalyst supporting device 100. The procedure of metal catalyst supporting process in the catalyst supporting device 100 is mainly divided into a preliminary process (steps S100 and S102), a dissolution process (steps S110 and S112), an adsorption process (steps S120 to S124), a complex reduction process (step S130), a deposition process (step S140) and a post process (step S150).

<Preliminary Process>

The preliminary process is a preparation process to develop the processing environment in the processing chamber 101. At step S100, the CNT substrate 10 is mounted on the carrier mounting structure 110 in the processing chamber 101. The processing chamber 101 is filled with the fluid supplied from the fluid reservoir 131 of the fluid supply assembly 130. In this embodiment, the processing chamber 101 is filled with carbon dioxide in the gas state.

At step S102, the fluid filled in the processing chamber 101 is made in a supercritical state. The controller 160 starts rotating and driving the circulation fan 122. The controller 160 also controls the fluid supply assembly 130 to increase the pressure of the fluid in the processing chamber 101 above its critical pressure and circulates warm water through the cooling medium circulation piping 152 to increase the temperature of the fluid above its critical temperature.

<Dissolution Process>

The dissolution process is a process of dissolving the complex of the metal catalyst in the supercritical fluid. At step S110, the controller 160 changes over the connection of the three-way valve 133 of the fluid supply assembly 130 to supply the complex solution from the raw material reservoir 132 to the processing chamber 101. After a required amount of the complex solution is supplied to the processing chamber 101, the controller 160 waits for a predetermined standby time in step S112. During this standby time, the controller 160 continues driving the circulation fan 122 to disperse the complex in the supercritical fluid. At step S112, the heater unit 111 of the carrier mounting structure 110 remains inactive.

<Adsorption Process>

The adsorption process is a process of adsorbing the complex of the metal catalyst on the surface of the carrier for formation and growth of crystal nuclei of the metal catalyst. In the catalyst supporting device 100 of the embodiment, temperature control in this adsorption process varies a temperature difference $\Delta T$ between the sample temperature $T_S$ and the ambient temperature $T_F$ and thereby suppresses a variation in particle diameter of the crystal nuclei of the metal catalyst. In the description hereof, "varying the temperature difference $\Delta T$" means actively varying the temperature difference $\Delta T$ by temperature control.

Figure 4:
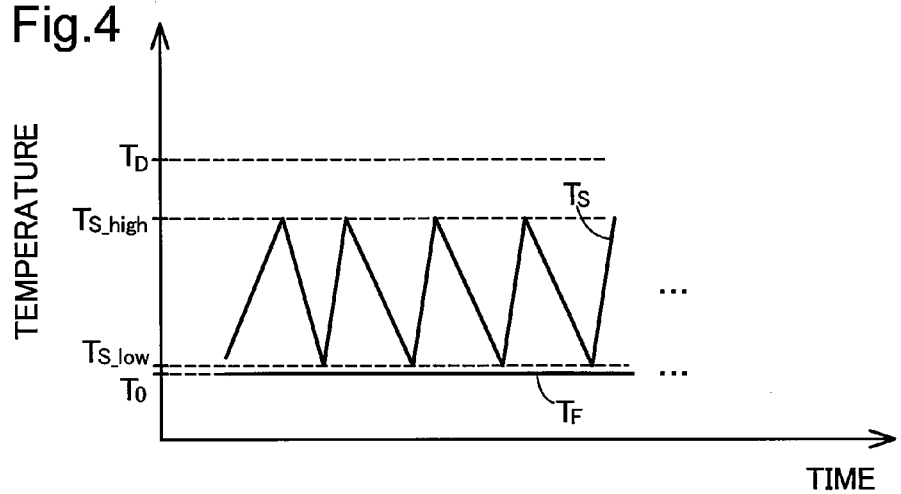
FIG. 4 is a diagram illustrating temperature control of the catalyst supporting device in an adsorption process.

FIG. 4 is a diagram illustrating the temperature control of the catalyst supporting device 100 in the adsorption process. FIG. 4 is a graph schematically showing time changes of the ambient temperature $T_F$ and the sample temperature $T_S$ in the adsorption process. In the adsorption process, the controller 160 controls the ambient temperature $T_F$ to a predefined temperature $T_0$ as a target value by means of the fluid temperature controller 150. This embodiment uses supercritical carbon dioxide as the supercritical fluid, so that the predefined temperature $T_0$ is about 40 to 50° C.

At step S120 in FIG. 3, the controller 160 controls the heater unit 111 to increase the sample temperature $T_S$ to a predetermined temperature $T_{S\_high}$ to be higher than the ambient temperature $T_F$ and thereby cause a specified temperature difference $\Delta T$ between the ambient temperature $T_F$ and the sample temperature $T_S$. The temperature difference $\Delta T$ between the ambient temperature $T_F$ and the sample temperature $T_S$ creates a concentration distribution in the neighborhood of the carrier and thereby accelerates adsorption of the complex of the metal catalyst onto the surface of the carrier.

It is preferable that the temperature $T_{S\_high}$ is lower than the deposition temperature of the metal catalyst (thermal decomposition temperature of the raw material). This is because the metal catalyst is likely to start deposition when the temperature $T_{S\_high}$ is higher than the deposition temperature of the metal catalyst or is significantly close to the deposition temperature (for example, temperature of about 90% of the deposition temperature). This embodiment uses platinum as the metal catalyst, so that the temperature $T_{S\_high}$ is about 100 to 150° C. and the temperature difference $\Delta T$ is not greater than 100° C.

At step S122, the controller 160 decreases the heating temperature of the heater unit 111 so as to decrease the sample temperature $T_S$ to a predetermined temperature $T_{S\_low}$. The greater variation range of the temperature difference $\Delta T$ is preferable in the adsorption process (due to the reason described below). It is, however, preferable that the temperature $T_{S\_low}$ low after the decrease of the sample temperature $T_S$ is consistently higher than the ambient temperature $T_F$. The temperature $T_{S\_low}$ is thus preferably a temperature slightly higher than the ambient temperature $T_F$. More specifically, the temperature $T_{S\_low}$ is preferably in a range of the following inequality (a):

$$T_F < T_{S\_low} \leq 1.1 \cdot T_F \quad (a)$$

The controller 160 alternately repeats the processing of step S120 and the processing of step S122 for a specified time period (step S124). The specified time period is a duration determined in advance according to a target amount of the metal catalyst to be supported on the carrier. The reason why a variation in particle diameter of the crystal nuclei is suppressed by repeating the increase and the decrease of the temperature difference $\Delta T$ will be described later.

<Complex Reduction Process>

The complex reduction process (FIG. 3) is a process of reducing the excess complex remaining in the fluid in the processing chamber 101 after the adsorption process. At step S130, the controller 160 opens the on-off valve 142 of the fluid discharge assembly 140 to temporarily decrease the pressure of the fluid in the processing chamber 101 to or below, for example, 1 MPa, so as to reduce the concentration of the complex in the processing chamber 101.

Performing the complex reduction process prior to the deposition process allows the excess complex remaining in the processing chamber 101 to deposit in the deposition process and thereby suppresses the non-uniform dispersibility of the metal catalyst on the carrier. At step S130, the controller 160 may further control the fluid supply assembly 130 and the fluid discharge assembly 140 to perform a purge process that repeats filling the processing chamber 101 with the fluid (carbon dioxide in this embodiment) and expelling the fluid from the processing chamber 101 a plurality of times. This further reduces the concentration of the complex in the processing chamber 101.

<Deposition Process>

The deposition process is a process of metallizing the crystal nuclei adsorbed on the carrier to deposit the metal catalyst in the form of particles. At step S140, the controller 160 closes the on-off valve 142 of the fluid discharge assembly 140 to seal the processing chamber 101. The controller 160 then decreases the ambient temperature $T_F$ and the pressure $P_F$ from the values in the adsorption process while increasing the sample temperature $T_S$ to or above the deposition temperature of the metal catalyst by heating the heater unit 111 and waits for a specified time period with keeping this state. More specifically, the procedure of this embodiment controls the pressure $P_F$ to about several MPa, the ambient temperature $T_F$ to about 25 to 45° C. and the sample temperature $T_S$ to about 190 to 210° C. and keeps this state for about 60 to 70 minutes. This causes the metal catalyst to deposit on the surface of the carrier.

<Post Process>

In the post process, the fluid of the processing chamber 101 is discharged by the fluid discharge assembly 140. The carrier is then taken out of the processing chamber 101. The carrier mounting structure 110 may be equipped with, for example, a conveying roller to convey the CNT substrate 10 out.

Figure 5:
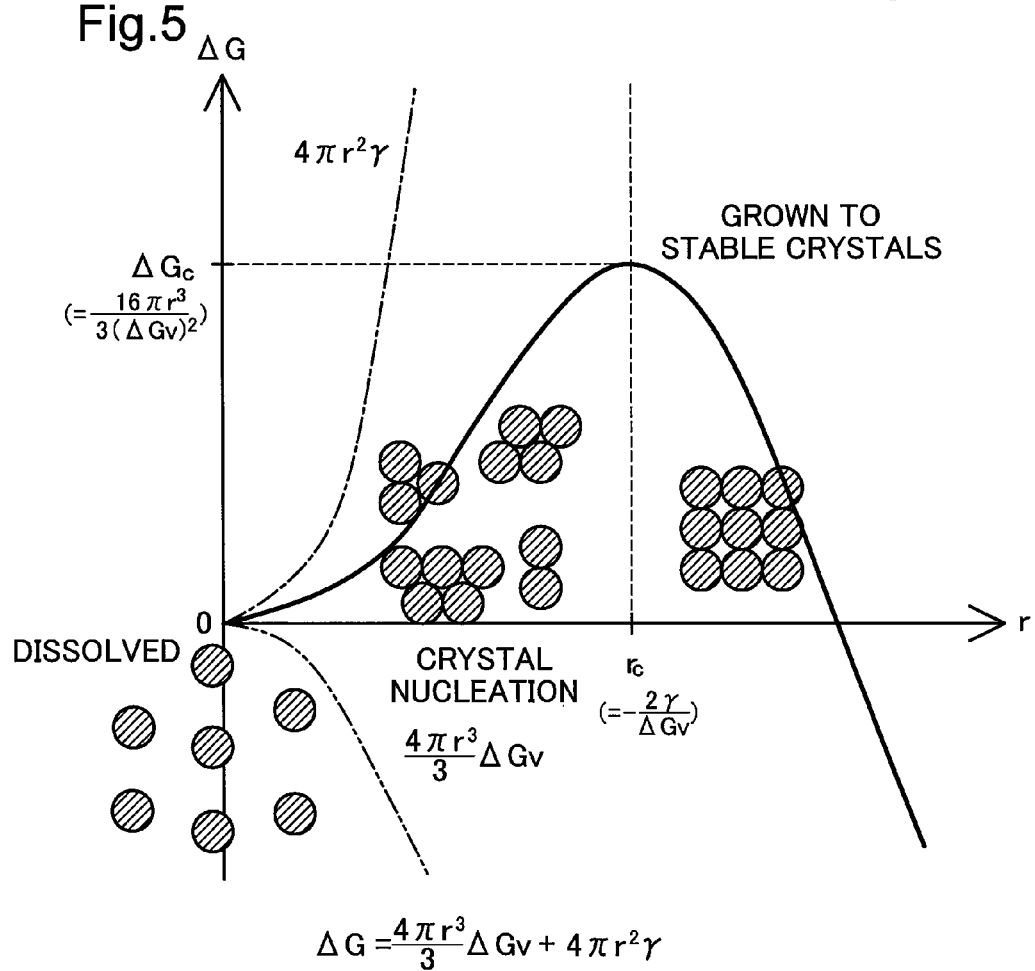
FIG. 5 is a diagram showing a relationship free energy variation $\Delta G$ to particle diameter r of crystal nuclei.
Figure 6:
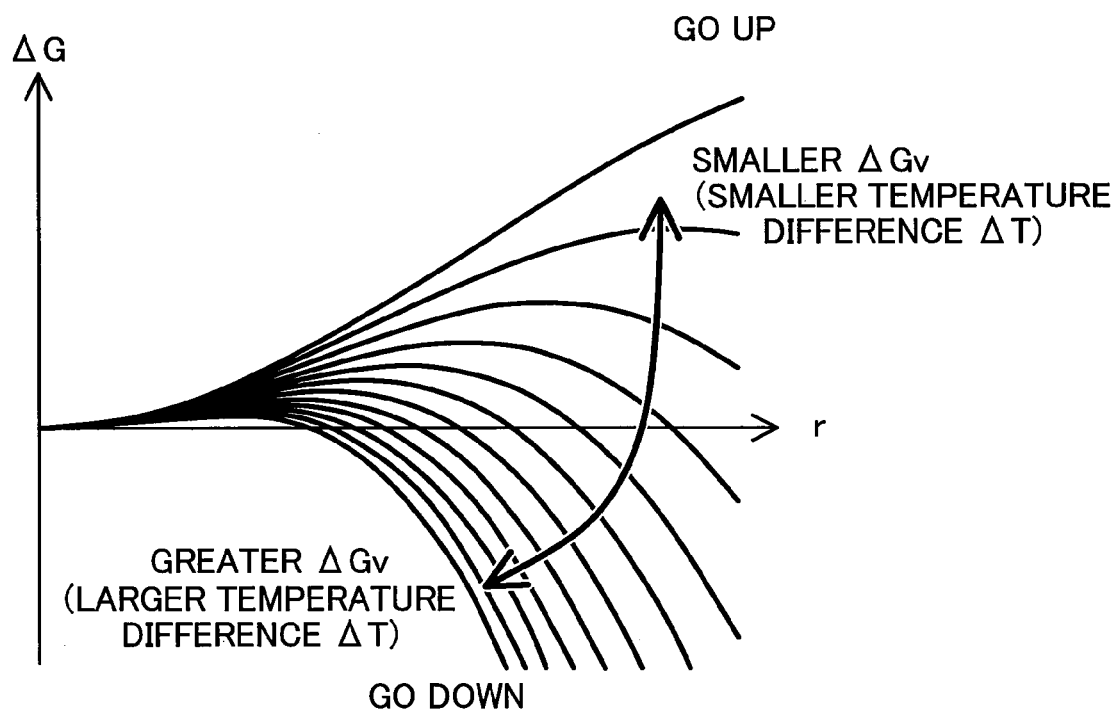
FIG. 6 is a graph showing a change in relationship between the free energy variation $\Delta G$ and the particle diameter r of the crystal nuclei with a change of $\Delta G_V$.

The following describes the principle of suppressing a variation in particle diameter of the crystal nuclei formed on the surface of the carrier by the temperature control in the adsorption process (FIG. 4) with reference to FIGS. 5 to 7. FIG. 5 illustrates a graph showing a relationship of variation $\Delta G$ of free energy before and after formation of crystal nuclei in the fluid (hereinafter referred to as "free energy variation $\Delta G$) to particle diameter r of the crystal nuclei. The particle diameter r of the crystal nuclei is a parameter on the assumption that the crystal nuclei are spherical.

It is known that there is a relationship between the free energy variation $\Delta G$ and the particle diameter r of the crystal nuclei shown by Equation (A) given below:

$$\Delta G = (4\pi r^3/3)\Delta G_V + 4\pi r^2 \gamma$$

where $\Delta G_V$ denotes a free energy variation per unit volume and may take a negative value, and $\gamma$ denotes surface free energy per unit area.

Equation (A) shows that the free energy variation $\Delta G$ is equal to the sum of a decrement of free energy $((4\pi r^3/3)\Delta G_V)$ due to cancellation of the oversaturation state and a change toward liquid-solid equilibrium and an increment of free energy $(4\pi r^2\gamma)$ due to generation of a new solid surface. In other words, the free energy variation $\Delta G$ is interpreted as the sum of energy serving to cause the crystal nuclei to disappear (to be dissolved) and energy serving to maintain the surface of the crystal nuclei.

According to Equation (A), the free energy variation $\Delta G$ reaches a maximum value $\Delta G_c$ when the particle diameter r is equal to $r_c$ (hereinafter referred to as "critical diameter $r_c$"):

$$r_c = -2\gamma/\Delta G_V$$

$$\Delta G_c = 16\pi r^3/(3\Delta G_V^2)$$

When the particle diameter r is smaller than the critical diameter $r_c$, the free energy variation $\Delta G$ has an increasing tendency, so that the crystal nuclei are thermodynamically unstable and are likely to be dissolved. When the particle diameter r exceeds the critical diameter $r_c$, on the other hand, the free energy variation $\Delta G$ starts decreasing, so that the crystal nuclei keep growing to form thermodynamically stable crystals.

FIG. 6 is a graph showing a change in relationship between the free energy variation $\Delta G$ and the particle diameter r of the crystal nuclei with a change of $\Delta G_V$. The graph showing the relationship between the free energy variation $\Delta G$ and the particle diameter r of the crystal nuclei goes up with a decrease of $\Delta G_V$ and goes down with an increase of $\Delta G_V$. In other words, the smaller $\Delta G_V$ gives the greater critical diameter $r_c$ and the greater maximum value $\Delta G_c$, and the greater $\Delta G_V$ gives the smaller critical diameter $r_c$ and the smaller maximum value $\Delta G_c$.

This indicates that the smaller $\Delta G_V$ facilitates growth of the crystal nuclei of the metal catalyst in the fluid, while the greater $\Delta G_V$ facilitates dissolution of the crystal nuclei of the metal catalyst in the fluid. Accordingly, formation and growth of the crystal nuclei of the metal catalyst in the fluid are controllable by controlling $\Delta G_V$.

In the catalyst supporting device 100, the temperature difference $\Delta T$ between the sample temperature $T_S$ and the ambient temperature $T_F$ works as the driving force for adsorption of the complex onto the surface of the CNTs 11. Accordingly, $\Delta G_V$ increases with an increase of the temperature difference $\Delta T$, and $\Delta G_V$ decreases with a decrease of the temperature difference $\Delta T$. In other words, formation and growth of the crystal nuclei of the metal catalyst in the fluid are controllable by controlling the temperature difference $\Delta T$ between the sample temperature $T_S$ and the ambient temperature $T_F$.

FIG. 7A is a schematic diagram illustrating formation and growth of crystal nuclei of the metal catalyst in the adsorption process of the embodiment. FIG. 7A is a diagram illustrating a change in state of the CNT substrate 10 in the adsorption process in time series. As described above, in the catalyst supporting device 100 of the embodiment, varying the temperature difference $\Delta T$ between the sample temperature $T_S$ and the ambient temperature $T_F$ is repeated in the adsorption process (FIG. 4). When the sample temperature $T_S$ has an increasing tendency to increase the temperature difference $\Delta T$, this increases $\Delta G_V$ and accelerates formation and growth of crystal nuclei 13 on the surface of the CNTs 11.

When the sample temperature $T_S$ starts decreasing to decrease the temperature difference $\Delta T$, however, this decreases $\Delta G_V$. This suppresses but still continues formation of the crystal nuclei, while suppressing the growth of the crystal nuclei 13 exceeding the critical diameter $r_c$ in the previous stage at which the sample temperature $T_S$ has the increasing tendency. When the sample temperature $T_S$ starts increasing again to increase the temperature difference $\Delta T$, this starts the growth of the crystal nuclei formed in the previous stage and reaccelerates the growth of the crystal nuclei under suppression in the previous stage.

FIG. 7B is a diagram illustrating a change in state of the CNT substrate 10 in the adsorption process in time series when the temperature difference $\Delta T$ between the ambient temperature $T_F$ and the sample temperature $T_S$ is substantially kept constant, as a reference example. In this reference example, the crystal nuclei exceeding the critical diameter $r_c$ on the surface of the CNTs 11 continue growing. Accordingly, the crystal nuclei formed beyond the critical diameter $r_c$ earlier become larger in size. This increases a difference in particle diameter between the crystal nuclei formed earlier and the crystal nuclei formed later.

The adsorption process of the embodiment includes a specific time period when the growth of the crystal nuclei formed beyond the critical diameter $r_c$ earlier is temporarily suppressed. This reduces a difference in particle diameter between the crystal nuclei formed beyond the critical diameter $r_c$ earlier and the crystal nuclei formed beyond the critical diameter $r_c$ later. Accordingly, this suppresses a variation in particle diameter of the crystal nuclei formed in the adsorption process.

Increasing the variation range of the temperature difference $\Delta T$ between the ambient temperature $T_F$ and the sample temperature $T_S$ in the adsorption process more effectively suppresses the growth of the crystal nuclei by temporary reduction of the temperature difference $\Delta T$. Repeatedly varying the temperature difference $\Delta T$ at narrower intervals in the adsorption process controls the growth of the crystal nuclei little by little and thereby more effectively suppresses a variation in particle diameter of the crystal nuclei.

Figure 8:
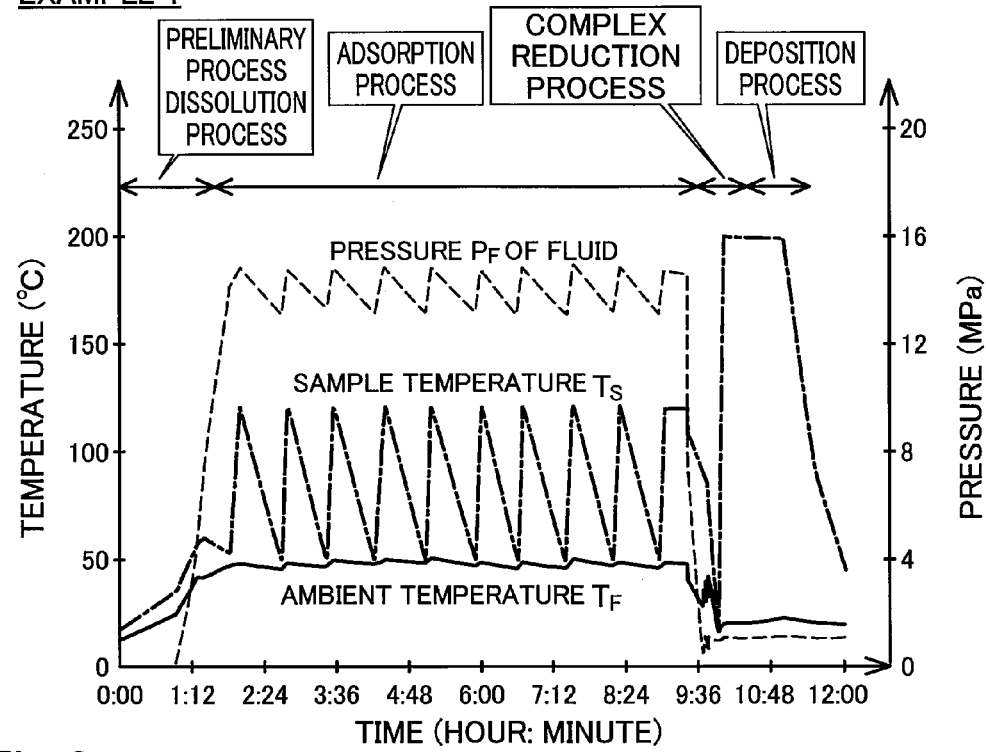
FIG. 8 is a diagram showing processing conditions of Example 1.
Figure 9:
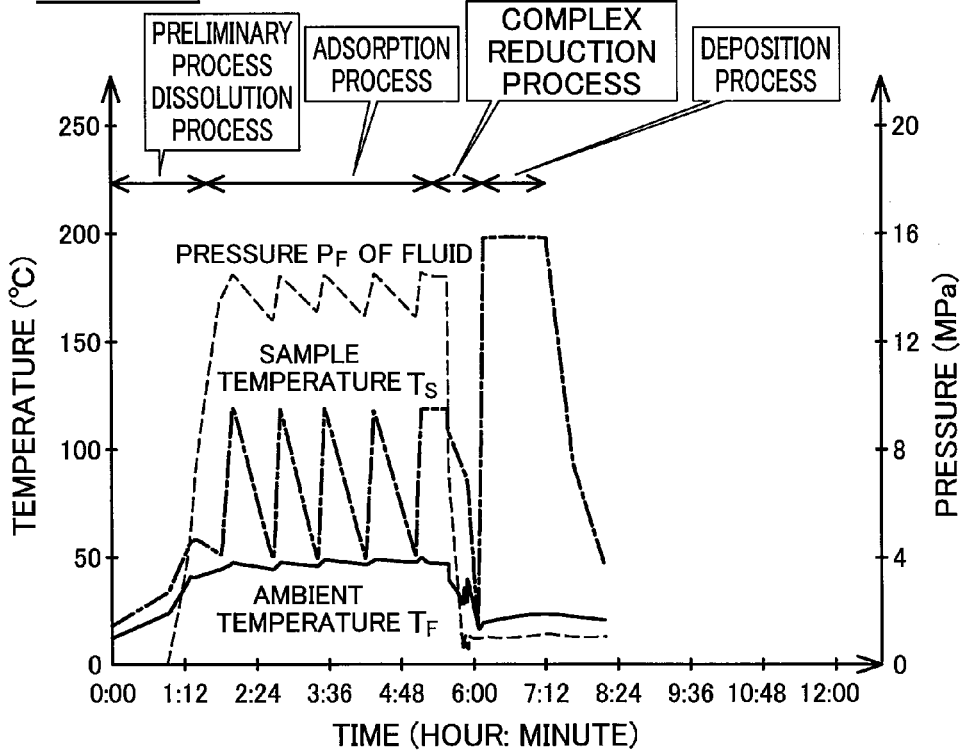
FIG. 9 is a diagram showing processing conditions of Example 2.

FIGS. 8 to 10 are diagrams illustrating processing conditions of experiment performed by the inventors of the present application. The inventors of the present application used a device having a similar configuration to that of the catalyst supporting device 100 described above with reference to FIG. 1 and performed the metal catalyst supporting process with varying the processing conditions in the adsorption process as Example 1, Example 2 and Reference Example. FIGS. 8 to 10 are graphs respectively showing time changes of the sample temperature $T_S$, the ambient temperature $T_F$ and the pressure $P_F$ of the fluid in the respective processes of Example 1, Example 2 and Reference Example. In the graphs of FIGS. 8 to 10, the time divisions of the respective processes are indicated by the arrows. The following gives the specific processing conditions of Example 1, Example 2 and Reference Example:

<Materials (common to Examples 1 and 2 and Reference Example)>
   metal catalyst: platinum
   carrier: CNT
   supercritical fluid: supercritical carbon dioxide
   complex solution: solution prepared by dissolving dimethylcyclooctadiene platinum (II) in hexane <Processing Conditions in Adsorption Process of Example 1 (FIG. 8)>
   processing time: about 8 hours
   ambient temperature $T_F$: about 45 to 50° C.
   variation range of sample temperature $T_S$: 50 to 120° C.
   frequency of varying sample temperature $T_S$: 10 times (at substantially fixed cycles)

<Processing Conditions in Adsorption Process of Example 2 (FIG. 9)>
   processing time: about 5 hours
   ambient temperature $T_F$: about 45 to 50° C.
   variation range of sample temperature $T_S$: 50 to 120° C.
   frequency of varying sample temperature $T_S$: 5 times (at substantially fixed cycles)

<Processing Conditions in Adsorption Process of Reference Examples (FIG. 10)>
   processing time: about 8 hours
   ambient temperature $T_F$: about 48 to 50° C.
   variation of sample temperature $T_S$: none (kept around 120° C.)

Figure 12A:
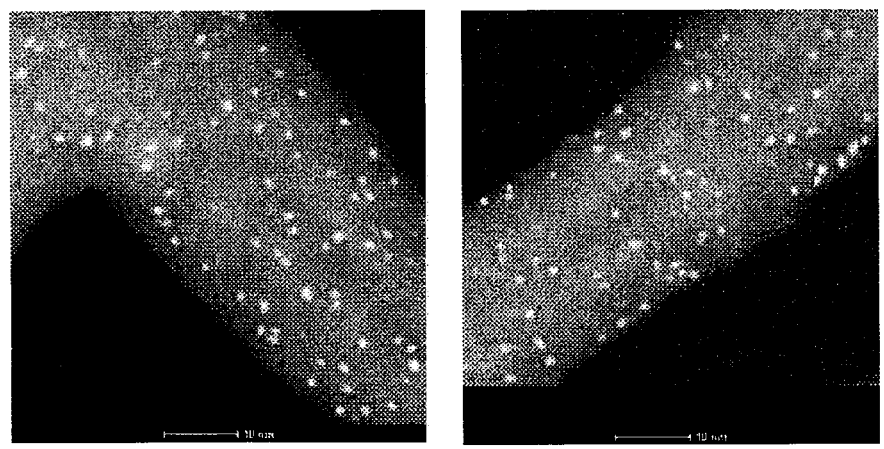
FIGS. 12A to 12C are diagrams illustrating the results of experiment of Examples 1 and 2 and Reference Example.
Figure 12B:
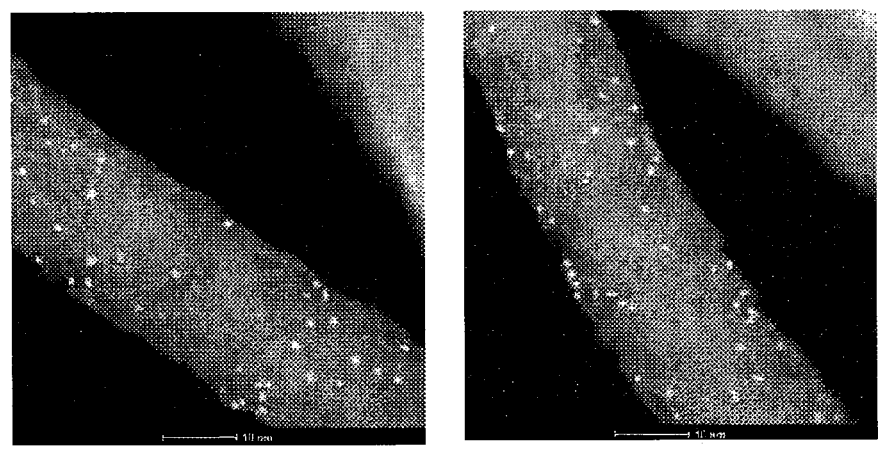
Figure 12C:
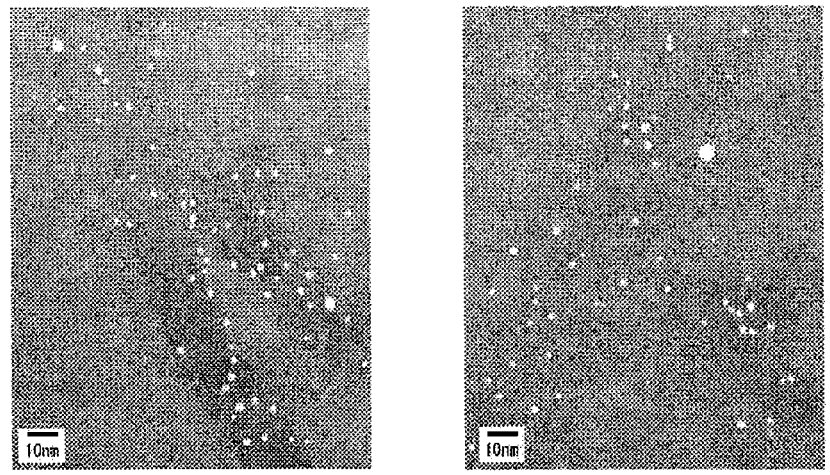

FIGS. 11 and 12 are diagrams illustrating the results of Examples 1 and 2 and Reference Example. FIG. 11A is a table showing part of the processing conditions in the adsorption process and the measurement results of platinum supported on the CNTs with respect to Example 1, Example 2 and Reference Example. FIG. 11B is a graph showing particle size distributions (number-based) of platinum on the CNTs, with particle diameter as abscissa and the occurrence rate (abundance ratio) as ordinate. FIGS. 12A, 12B and 12C respectively show TEM (transmission electron microscope) images of the CNTs on which platinum has been supported, with respect to Example 1, Example 2 and Reference Example.

Examples 1 and 2 had relatively similar measurement values of the average particle diameter and the standard deviation, but Reference Example had significantly larger measurement values of the average particle diameter and the standard deviation than those of Examples 1 and 2 (FIG. 11A). The average particle diameter was calculated on the assumption that the maximum width of each platinum particle at 300 to 600 points included in the TEM images was the particle diameter.

With respect to the particle size distribution, each of Examples 1 and 2 gave a steep-slope graph having a sharp peak indicating a significant increase in occurrence rate at a certain particle diameter, while Reference Example gave a relatively gentle-slope graph having a broad peak (FIG. 11B). Examples 1 and 2 had relatively similar ranges of particle size distribution, while Reference Example had a significantly wider range of particle size distribution than those of Examples 1 and 2.

Additionally, in the TEM images of Examples 1 and 2, dispersion of platinum particles of approximately uniform size were observed on the surface of the CNTs (FIGS. 12A and 12B). In the TEM image of Reference Example, on the other hand, platinum particles had non-uniform size and platinum particles of significantly larger size were found here and there (FIG. 12C).

As described above, the particle diameter of platinum is equalized in Examples 1 and 2, compared with Reference Example. These results show that the non-uniformity of the particle size distribution of the metal catalyst particles supported on the carrier is suppressible by varying the temperature difference $\Delta T$ between the ambient temperature $T_F$ and the sample temperature $T_S$ in the adsorption process.

The "weight per unit area" in the table of FIG. 11A denotes the weight of platinum per unit area on the surface of CNTs. With respect to the weight per unit area, Example 1 and Reference Example had similar measurement values, while Example 2 had a measurement value substantially half the above measurement values. These results show that the amount of the metal catalyst supported on the carrier is determined according to the processing time, irrespective of the variation of the temperature difference $\Delta T$ between the ambient temperature $T_F$ and the sample temperature $T_S$ in the adsorption process. In other words, the amount of the supported metal catalyst increases with an increase in processing time in the adsorption process.

As described above, in the catalyst metal supporting process performed by the catalyst supporting device 100 of the embodiment, the growth of the crystal nuclei of the metal catalyst is controlled by the temperature control in the adsorption process. This accordingly suppresses a variation in particle diameter of the metal catalyst on the carrier.

B. Second Embodiment

Figure 13:
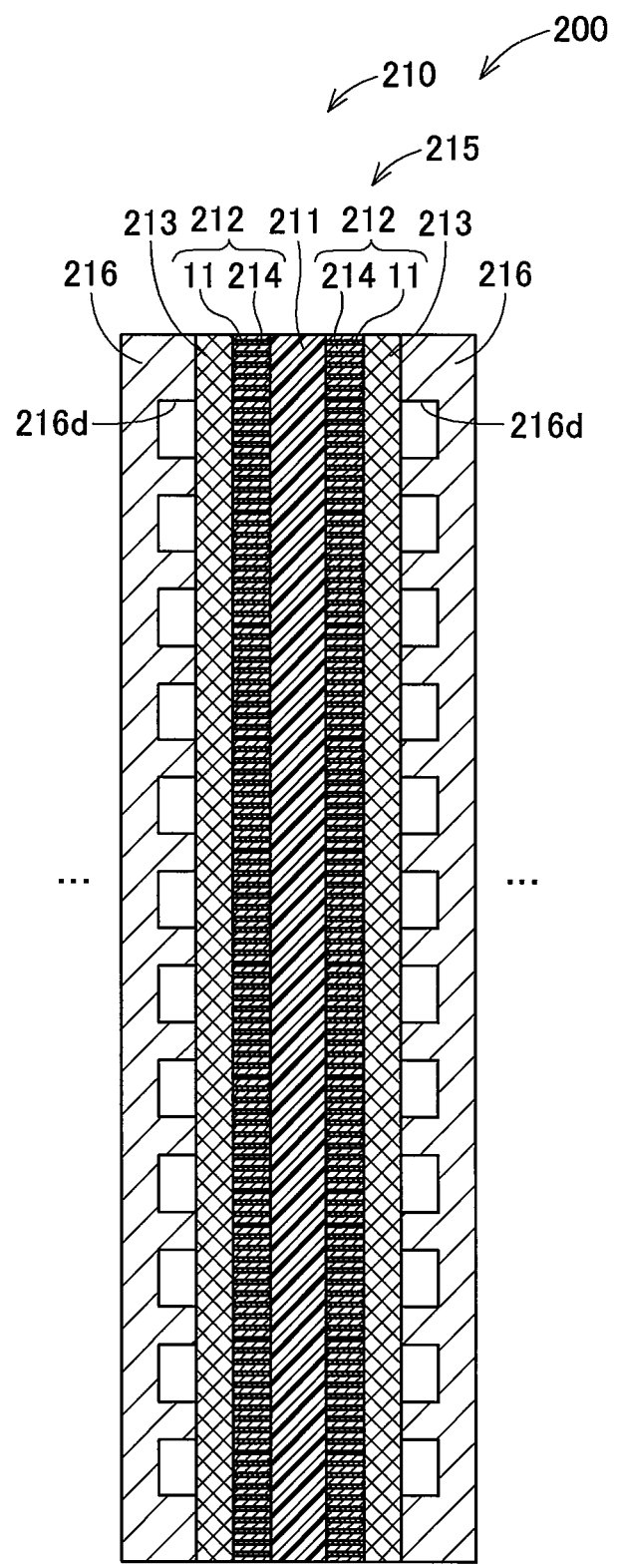
FIG. 13 is a schematic diagram illustrating the configuration of a fuel cell according to a second embodiment.

FIG. 13 is a schematic diagram illustrating the configuration of a fuel cell according to a second embodiment of the invention. This fuel cell 200 is a polymer electrolyte fuel cell that receives supplies of hydrogen and oxygen as reactive gases and generates electric power. The fuel cell 200 has a stack structure in which a plurality of unit cells 210 are stacked in series.

Each unit cell 210 includes a membrane electrode assembly 215 and two separators 216. The membrane electrode assembly 215 has an electrolyte membrane 211, two catalyst layers 212 and two gas diffusion layers 213. The electrolyte membrane 211 is a solid polymer thin film having good proton conductivity in the wet state. The electrolyte membrane 211 may be made of, for example, an ion exchange membrane of a fluororesin such as Nafion registered trademark.

The two catalyst layers 212 are placed on respective surfaces of the electrolyte membrane 211. Each of the catalyst layers 212 has CNTs 11 and an electrolyte resin 214. The CNTs 11 are closely arrayed across small gaps formed therebetween to serve as a flow path of a reactive gas and are arranged to be perpendicularly in contact with the surface of the electrolyte membrane 211. Platinum not shown in figures is supported on the surface of the CNTs 11, as a metal catalyst for accelerating electrochemical reaction.

The electrolyte resin 214 of the catalyst layer 212 is the same type of or an analogous type of solid electrolyte resin as or to that of the electrolyte membrane 211. The electrolyte resin 214 is attached to the surface of the CNTs 11. This electrolyte resin 214 contains the moisture during power generation of the fuel cell 200, so as to ensure a moving path of the proton in the catalyst layer 212. When the catalyst layer 212 is capable of holding a sufficient amount of moisture during power generation of the fuel cell 200, the electrolyte resin 214 may be omitted.

The fuel cell 200 of the second embodiment uses the CNTs 11 as the electrically conductive carrier on which platinum as the metal catalyst is supported, in the catalyst layer 212. This improves the electrical conductivity of the catalyst layer 212, the diffusiveness of the reactive gas and water drainage. The manufacturing process of this catalyst layer 212 will be described later.

The gas diffusion layer 213 may be made of a fiber base material having gas diffusivity and electrical conductivity, such as carbon fiber. The gas diffusion layer 213 is placed on the surface of the catalyst layer 212 and serves to diffuse the reactive gas over the entire catalyst layer 212. The material of the gas diffusion layer 213 is not limited to the fiber base material but may be a processed metal material such as expanded metal or punching metal. The gas diffusion layers 213 may be omitted.

The two separators 216 are plate-like members having electrical conductivity and gas impermeability. The separators 216 are placed outside of the gas diffusion layers 213 to be arranged across the membrane electrode assembly 215. Gas flow path grooves 216d are formed on an opposite surface of the separator 216 opposite to the membrane electrode assembly 215-side surface, in order to spread the reactive gas over the entire gas diffusion layer 213.

In each unit cell 210, an insulating seal member is placed around the outer circumference of the membrane electrode assembly 215, in order to prevent leakage of the fluids such as the reactive gases and short circuit between the separators 216, although neither being illustrated nor being described in detail. Manifolds which are connected to each unit cell 210 and which the reactive gases flow through are provided in the outer peripheral area of the membrane electrode assembly 215, although neither being illustrated nor being described in detail.

Figure 14:
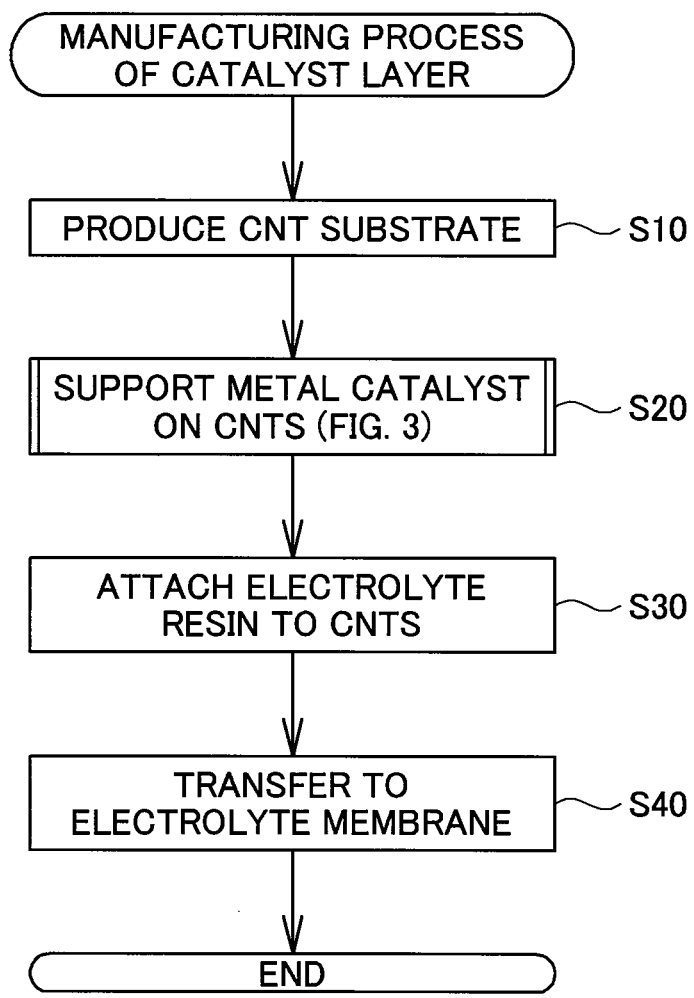
FIG. 14 is a flowchart showing a manufacturing process of a catalyst layer in the fuel cell of the second embodiment.

FIG. 14 is a flowchart showing a manufacturing procedure of the catalyst layer 212. At step S10, the procedure produces a CNT substrate. For example, the procedure forms CNTs on a substrate provided in advance, such as to make the CNTs grown perpendicularly to the substrate surface by chemical vapor deposition (CVD). The technique employed to form the CNTs is, however, not limited to CVD but may be any other suitable technique, for example, arc discharge, laser deposition or gas phase fluidization. At step S20, the procedure supports platinum on the CNTs of the CNT substrate by the process described in the first embodiment (FIG. 3).

At step S30, the procedure attaches an electrolyte resin to the CNTs of the CNT substrate. A concrete procedure may soak the CNT substrate in an ionomer solution to attach the electrolyte resin to the CNTs. Another concrete procedure may spray and apply the electrolyte resin onto the surface with the CNTs formed thereon of the CNT substrate. At step S40, the procedure transfers the CNTs and the electrolyte resin attached to the CNTs from the CNT substrate to an electrolyte membrane. This completes formation of the catalyst layer 212 (FIG. 13).

As described above, in the fuel cell 200 of the second embodiment, platinum is supported on the CNTs 11 of the catalyst layer 212 by the process described in the first embodiment (step S20). This suppresses a variation in size of platinum particles in the catalyst layer 212 and ensures the surface area of platinum, so that the fuel cell 200 of the second embodiment has the high power generation performance. This also suppresses adsorption and aggregation of platinum particles to reduce the surface area of platinum during continuation of power generation.

C. Modifications

C1. Modification 1

The above embodiment uses platinum as the metal catalyst to be supported on the carrier. The metal catalyst used is, however, not limited to platinum but may be another metal catalyst. For example, the following metal catalysts may be usable:

<Examples of other Metal Catalysts> rhodium, palladium, iridium, osmium, ruthenium, rhenium, gold, silver, nickel, cobalt, lithium, lanthanum, strontium, yttrium and alloys by combinations thereof.

C2. Modification 2

The above embodiment employs CNTs as the carrier and supports the metal catalyst on the CNTs. The carrier employed is, however, not limited to CNTs but may be another carrier. For example, a conductive powder such as carbon black may be used as the carrier. In this application, the metal catalyst supporting process may be performed after the powder is coated with a membrane filter. In another example, ink prepared by dispersing the powder in a resin such as PTFE may be applied on a substrate, and the substrate may be subjected to the metal catalyst supporting process. The carrier having the metal catalyst supported thereon by the catalyst supporting process may be used for another application but the electrode for fuel cell.

C3. Modification 3

The above embodiment uses supercritical carbon dioxide as the supercritical fluid. The supercritical fluid used is, however, not limited to supercritical carbon dioxide but may be another supercritical fluid. For example, supercritical trifluoromethane may be used as the supercritical fluid.

C4. Modification 4

In the above embodiment, the adsorption process repeats increasing and decreasing the temperature difference $\Delta T$ between the ambient temperature $T_F$ and the sample temperature $T_S$ over the entire time period of the adsorption process. The operation of varying the temperature difference $\Delta T$ may, however, not be necessarily repeated a plurality of times. There is a need to perform the operation of varying the temperature difference $\Delta T$ at least once in the adsorption process. Repeating the operation of varying the temperature difference ΔT in the adsorption process at the narrower intervals over the entire time period of the adsorption process leads to control of the growth of the crystal nuclei at a greater number of stages. This further equalizes the particle diameter of the metal catalyst.

C5. Modification 5

The above embodiment provides the complex reduction process between the adsorption process and the deposition process (FIG. 3). The complex reduction process may, however, be omitted. In this case, there is a need to change the state of the fluid (carbon dioxide) to a non-supercritical state after the adsorption process and subsequently perform the deposition process. Performing the complex reduction process prior to the deposition process suppresses excess platinum from depositing in an unnecessary area in the deposition process and thereby improves the dispersibility of platinum.

C6. Modification 6

The adsorption process of the above embodiment changes the heating temperature of the heater unit 111, so as to vary the temperature difference ΔT between the ambient temperature $T_F$ and the sample temperature $T_S$. The adsorption process may control the temperature of the cooling medium by means of the fluid temperature controller 150 to change the ambient temperature $T_F$ and thereby vary the temperature difference ΔT, in place of changing the heating temperature of the heater unit 111 or in addition to changing the heating temperature of the heater unit 111. In other words, there is a need to vary the temperature difference ΔT by controlling at least one of the ambient temperature $T_F$ and the sample temperature $T_S$.

C7. Modification 7

In the catalyst supporting device 100 of the above embodiment, the fluid supply assembly 10 supplies the complex solution stored in the raw material reservoir 132 as the raw material to the processing chamber 101 filled with the supercritical fluid. The raw material reservoir 132 may, however, be omitted. The raw material of the metal catalyst may be placed in the processing chamber 101, before the processing chamber 101 is filled with the fluid.

C8. Modification 8

In the above embodiment, the adsorption process increases the sample temperature $T_S$ above the ambient temperature $T_F$ and subsequently varies the temperature difference ΔT between the ambient temperature $T_F$ and the sample temperature $T_S$. It is, however, not necessary to increase the sample temperature $T_S$ above the ambient temperature $T_F$, prior to variation of the temperature difference ΔT. The ambient temperature $T_F$ may be higher than the sample temperature $T_S$, prior to variation of the temperature difference ΔT. There is a need to vary the temperature difference ΔT after making the temperature difference between the sample temperature $T_S$ and the ambient temperature $T_F$.

The invention is not limited to any of the embodiments, examples and modifications described herein but may be implemented by a diversity of other configurations without departing from the scope of the invention. For example, the technical features of any of the embodiments, examples and modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

REFERENCE SIGNS LIST

10 CNT substrate
11 CNTs
13 crystal nuclei
100 catalyst supporting device
101 processing chamber
110 carrier mounting structure
111 heater unit
112 contact layer
120 fluid circulation nozzle
121 main body
121a first opening
121b second opening
122 circulation fan
123 current plates
130 fluid supply assembly
131 fluid reservoir
132 raw material reservoir
133 three-way valve
134 supply piping
135 pump
136 on-off valve
140 fluid discharge assembly
141 discharge piping
142 on-off valve
150 fluid temperature controller
151 cooling medium supply unit
152 cooling medium circulation piping
160 controller
162 pressure detector
164 temperature detector
200 fuel cell
210 unit cell
211 electrolyte membrane
212 catalyst layer
213 gas diffusion layer
214 electrolyte resin
215 membrane electrode assembly
216 separator
216d gas flow path groove

The invention claimed is:

1. A manufacturing method of a metal catalyst-supporting carrier in which a metal catalyst is supported on a carrier, the manufacturing method comprising:
   (a) a process of placing the carrier in a processing chamber, filling the processing chamber with a supercritical fluid and dispersing a complex of the metal catalyst in the supercritical fluid;
   (b) a process of controlling at least one of a temperature of the carrier and an ambient temperature in the processing chamber, so as to make a temperature difference of or above a predetermined amount between the temperature of the carrier and the ambient temperature, subsequently reduce the temperature difference between the temperature of the carrier and the ambient temperature at least once and then increase the temperature difference; and
   (c) a process of changing state of the supercritical fluid to a non-supercritical state and subsequently causing the metal catalyst to deposit on surface of the carrier.

2. The manufacturing method according to claim 1,
wherein the process (b) controls a heating temperature of the carrier, so as to change the temperature of the carrier.

3. The manufacturing method according to claim 1,
wherein the process (b) comprises the steps of:
(b1) increasing the temperature of the carrier above the ambient temperature, so as to make the temperature difference of or above the predetermined amount between the temperature of the carrier and the ambient temperature; and
(b2) temporarily reducing the temperature difference between the temperature of the carrier and the ambient temperature, after the step (b1), and subsequently recovering the temporarily reduced temperature difference.

4. The manufacturing method according to claim 3,
wherein the step (b2) decreases the temperature of the carrier to a first temperature slightly higher than the ambient temperature and subsequently increases the temperature of the carrier to a second temperature lower than a deposition temperature of the metal catalyst.

5. The manufacturing method according to claim 3,
wherein the step (b2) repeats decreasing and increasing the temperature difference a plurality of times over an entire time period after the step (b1) and until the state of the supercritical fluid is changed to the non-supercritical state in the process (c).

6. The manufacturing method according to claim 3,
a time period after the step (b1) and until the state of the supercritical fluid is changed to the non-supercritical state in the process (c) is determined according to a target amount of the metal catalyst to be supported on the carrier.

7. A metal catalyst-supporting carrier in which a metal catalyst is supported on a carrier,
the metal catalyst-supporting carrier being manufactured by the manufacturing method according to claim 1.

8. A manufacturing method of a fuel cell, comprising:
a process of manufacturing a metal catalyst-supporting carrier in which a metal catalyst is supported on an electrically conductive carrier, by the manufacturing method according to claim 1; and
a process of forming an electrode layer having gas diffusivity from the metal catalyst supporting-carrier, such as to place the electrode layer on a surface of an electrolyte membrane.

\* \* \* \* \*